FIG_1_

INVENTOR
Joseph D. Christian
BY
Robert H. Eckhoff
ATTORNEY

April 11, 1950 J. D. CHRISTIAN 2,504,066
REDUCTION GEAR
Filed April 25, 1947 2 Sheets-Sheet 2

INVENTOR
Joseph D. Christian
BY
Robert H. Eckhoff
ATTORNEY

Patented Apr. 11, 1950

2,504,066

UNITED STATES PATENT OFFICE 2,504,066

REDUCTION GEAR

Joseph D. Christian, San Francisco, Calif., assignor to The American Pulley Company, Philadelphia, Pa., a corporation of Pennsylvania Application April 25, 1947, Serial No. 743,754

5 Claims. (Cl. 74—421)

This invention relates to a reduction gear transmission of the type designed to mount on the shaft of a driven machine.

For the widest interchangeability possible to make stocking feasible, and to obviate the necessity of structural changes in either the driven machine or the prime mover, a class of reduction gear devices has been developed which comprise a housed reduction gear providing the desired ratio between the driving and driven shafts. The driven shaft of the reduction gear unit is designed for mounting upon the driven shaft of the machine. The driving shaft of the reduction gear unit is driven as by a belt, etc., from a prime mover. The housing is secured in some fashion to prevent its rotation.

One of the considerations involved in such a structure is compactness of design. To this end the side walls of the housing are to be as close together as is possible. On the other hand it is desirable to have the cooperating bearings of the various shafts in the housing spaced as far apart as is feasible.

Low over-all width of the housing and shafts is desirable, among other reasons, because the bending moment caused by, for example, a belt on the driving shaft should be kept as low as possible.

It is also desirable to have driving and driven shafts concentric. The housing will usually include provision for retaining oil for lubricating the gears and bearings involved.

It is an object of the present invention to provide a structure allowing increased shaft bearing spacings within a housing of given dimensions.

It is a further object to provide a structure wherein certain gears and bearings may be mutually so located as to secure improved distribution of the actual loading and thus increase the life of the bearings and increase the rating of the device.

A further object is to provide a structure having an increased load capacity as compared with prior devices of the same size.

Figure 1:
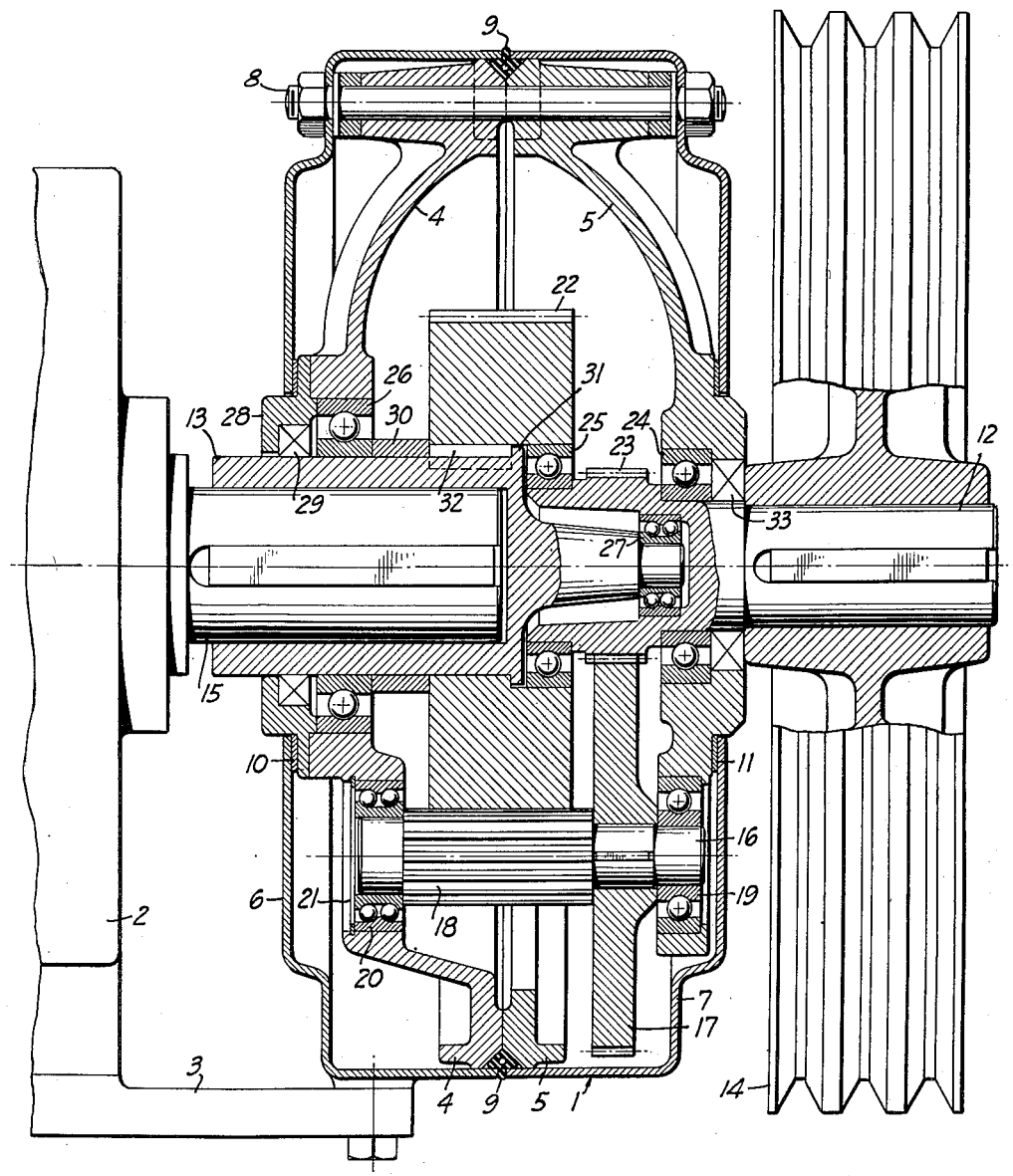
Figure 1 is a section of one modification of my reduction gear unit.

Referring particularly to Figure 1, the reduction gear unit is indicated generally by the Figure 1. The driven machine is indicated at 2 and means for preventing rotation of the gear housing is indicated by reference numeral 3.

In this structure I employ two cooperating support members 4 and 5. These elements are in the shape of spiders coming together at the outer periphery and being spaced and parallel at their inner portions. Cover members 6 and 7 and supports 4 and 5 are all secured together by a plurality of bolts 8. Gaskets 9, 10 and 11 complete an oil-tight enclosure. The high speed or driving shaft 12 and low speed or driven shaft 13 are concentric with each other. A multi-V-belt pulley 14 is indicated mounted on the shaft 12 and shaft 13 is indicated as mounted on shaft 15 of the machine 2.

The countershaft 16 is carried in bearings 19 and 20 in supports 4 and 5 and has gears 17 and 18 secured thereto. Snapring 21 locates bearing 20.

Low speed gear 22 is secured to low speed shaft 13; formed on or secured to high speed shaft 12 is high speed pinion 23. This shaft is carried at one end in the support 5 on a bearing 24 and its other end supported by bearing 25, the outer race of which is carried in an integral portion of shaft 13 or, as shown, in a bore made in gear 22. Shaft 13 is carried in support 4 on bearing 26 and, on an extended and reduced portion, by a bearing 27 which is socketed in the high speed shaft 12.

Plate 28, secured as desired, locates the outer race of bearing 26 and includes a seal 29. In this structure the gear 22 is pressed on over the left hand end of shaft 13 and is abutted against an extension 31 and keyed to the shaft by the key 32. A spacing ring 30 is interposed between gear 22 and the inner race of bearing 26.

It will be evident that the shafts 12 and 13 are maintained against end play by the cooperation of ball type bearings 26, 27 and 24, while the bearing 25 floats. Bearing 24 is sealed at 33.

From the structure thus far described it will be evident that upon driving shaft 12, shaft 13 will be driven through the gear train 23, 17, 18 and 22. Ratios between the driving and driven shafts common in the art are from 12 to 1 to 14 to 1, but any desired ratio may of course be attained.

I have shown shaft 13 as having a female recess to be mounted upon a driven shaft. This might of course be changed so as to provide a shaft extension which could be secured as by a collar to the said driven shaft, though this is not a preferred form of mounting.

Figures 2, 3:
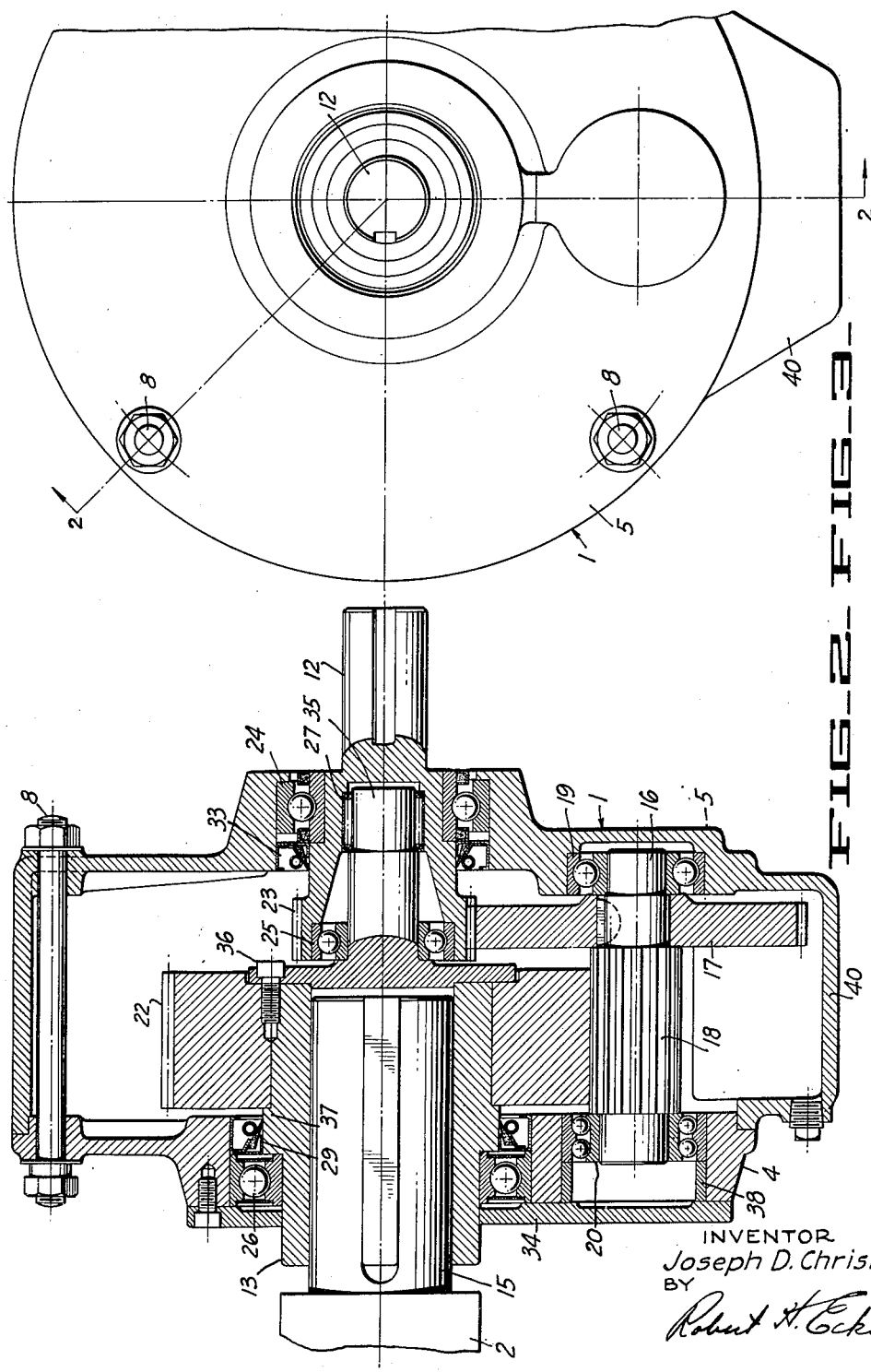
Figure 2 is a section of a modified construction.
Figure 3 is an end elevation of the housing of the construction shown in Figure 2.

In Figure 2 I show a somewhat modified form of the invention. Reference characters applied to identical parts will be identical. Thus there is the driving shaft 12 and driven shaft 13 concentric therewith. Support members 4 and 5 now constitute the outer walls of the device, thus doing away with the elements 6 and 7 of Figure 1 and their functions.

In the device shown in Figure 1, the housing is circular in shape and the diameter is determined by the countershaft gear 17. I am in this embodiment of the invention employing a smaller concentric, cylindrical housing with a depending portion 40 which forms an oil reservoir and in which gear 17 turns. This structure secures a smaller appearance and an actually smaller over-all dimension and decreased weight of the device, while retaining the feature of concentricity of machined surfaces.

Cover plate 34 completes the oil-tight housing and locates bearing 26. The extension of shaft 13 is now constituted by a portion 35 secured to the main portion of the shaft by cap-screws 36 which also act to secure gear 22 against turning and to locate it against the collar 37 which may be integral with the shaft 13.

The oil seals 29 and 33 are located inward from bearings 26 and 24 respectively, which bearings are of the sealed-for-life type.

Bearing 25 is contained inside the recess in shaft 12 and both races are located against shoulders on the respective shafts. End location of the two shafts now is the responsibility of bearings 26, 25 and 24. Bearing 27 is now a needle bearing having no end thrust or location function. Spacing ring 38 cooperates with cover 34 to locate bearing 26.

Common to both structures are the concentric shafts 12 and 13 and the feature of an end bearing of each shaft being carried by the other shaft. Since shafts 12 and 13 inherently rotate in the same direction though at different speeds, the effective speed of rotation of the bearings 25 and 27 will in each case be the difference between the shaft speeds. This results in a very considerable increase in life or alternately in a higher allowable load factor.

The structure shown in Figure 2 allows increased bearing spacing over that of Figure 1. Gear 22 is carried closer to the large bearing 26 in the device of Figure 2. The large size of this bearing 26 is necessitated by other considerations than load, therefore it is capable of carrying all the load that may be put upon it.

The device of Figure 2 is improved over that of Figure 1 in respect of the location of bearings 25 which is directly in the line of the load between gears 23 and 17. Further the end thrust provisions of Figure 2 allow the use of the relatively cheap needle bearing 27 rather than a ball bearing at that point.

It will be noted that I avoid the weight and other disadvantages inherent in the use of a third wall for locating the inner bearings. One advantage of this is to allow an increased spacing on the bearing. A second advantage is to allow broader faced gears and thus increased loading within a casing of the same over-all width.

Various permutations of the several features will be obviously possible. For example, in Figure 1, bearing 25 which is floating may be a needle bearing rather than the ball bearing shown. The bearing and gear arrangement shown in Figure 1 may be employed in a case as shown in Figure 2 and vice versa. The bearing and seal arrangement shown in Figure 2 could be changed to that shown in Figure 1. This would allow closer spacing of the gear 22 to the bearing 26.

While I have shown spur gears for convenience in illustrating, it will be obvious that herringbone or helical gears may be utilized.

The needle bearings shown at 27 in Figure 2 may be used in Figure 1 provided that bearing 25 is fixed in position as by having the outer race carried against a shoulder in the gear 22 or on the end of shaft 13. Gear 22 may be integral with shaft 13, though this would be an expensive construction.

I claim:

1. A transmission adapted to be mounted on an extending power input shaft of a unit to be driven and to provide a speed reduction between a prime mover and the input shaft of the unit to be driven; said transmission comprising a casing having a first and a second wall, a high speed shaft adapted to be driven by said prime mover and including a tubular portion within said casing, a first bearing supporting said high speed shaft in the first wall intermediate the ends of said shaft, a low speed shaft coaxial with the high speed shaft and having one end thereof extending into the tubular portion of the high speed shaft, the other end of said low speed shaft being tubular for mounting on the extending power input shaft of the unit to be driven, a second bearing supporting the end of the low speed shaft in the tubular portion of the high speed shaft, a third bearing supporting the low speed shaft in the second wall intermediate the ends of said low speed shaft, a first gear secured on said low speed shaft adjacent the extending end thereof, a fourth bearing carried by the low speed shaft intermediate said second and third bearings and by the tubular portion of the high speed shaft, a countershaft, bearing means supporting said countershaft in said first and said second walls, a second gear on the high speed shaft intermediate said first and said fourth bearings, a third gear on said countershaft in mesh with said second gear, and a fourth gear on said countershaft in mesh with said first gear.

2. A transmission adapted to be mounted on an extending power input shaft of a unit to be driven and to provide a speed reduction between a prime mover and the input shaft of the unit to be driven, said transmission comprising a high speed shaft adapted to be driven by the prime mover, a low speed shaft, each of said shafts having a solid portion and a tubular portion, the solid portion on the low speed shaft being positioned within the tubular portion of the high speed shaft, the tubular portion of the low speed shaft being adapted to receive the extending power input shaft of the unit to be driven, a first and a second bearing carried by the tubular portion of the high speed shaft and by said low speed shaft and supporting said shafts in coaxial alignment and for rotation with respect to each other, a casing having first and second wall portions substantially parallel to each other, a bearing in the first wall portion supporting the high speed shaft for rotation with the solid end thereof projecting beyond the wall for a driving connection to the prime mover, a bearing in the second wall portion supporting the low speed shaft for rotation, a countershaft, bearings in said first and second wall portions supporting the countershaft, and gearing on the high speed and low speed shafts and on the countershaft for driving the low speed shaft from the high speed shaft in the same direction and at a reduced rotational rate.

3. A transmission adapted to be mounted on an extending power input shaft of a unit to be driven and to provide a speed reduction between a prime mover and the input shaft of the unit to be driven, said transmission comprising a casing having a first and a second wall, a high speed shaft adapted to be driven by said prime mover and including a tubular portion within said casing, a first bearing supporting said high speed shaft in the first wall intermediate the ends of said shaft, a low speed shaft coaxial with the high speed shaft having one end thereof extending into the tubular portion of the high speed shaft, the other end of said low speed shaft being tubular for mounting on the extending power input shaft of the unit to be driven, a second bearing supporting said one end of the low speed shaft in the tubular portion of the high speed shaft, a third bearing supporting the low speed shaft in the second wall intermediate the ends of said low speed shaft, a first gear secured on said low speed shaft adjacent the extending end thereof, a fourth bearing on the tubular end of the high speed shaft and journalled in said first gear, a countershaft, bearing means supporting said countershaft in said first and said second walls, a second gear on the high speed shaft intermediate said first and said fourth bearings, a third gear on said countershaft in mesh with said second gear, and a fourth gear on said countershaft in mesh with said first gear.

4. A transmission adapted to be mounted on an extending power input shaft of a unit to be driven and to provide a speed reduction between a prime mover and the input shaft of the unit to be driven, said transmission comprising a casing having a first and a second wall, a high speed shaft adapted to be driven by said prime mover and including a tubular portion within said casing, a first bearing supporting said high speed shaft in the first wall intermediate the ends of said shaft, a low speed shaft coaxial with the high speed shaft and having one end thereof extending into the tubular portion of the high speed shaft, the other end of said low speed shaft being tubular for mounting on the extending power input shaft of the unit to be driven, a second bearing supporting the end of the low speed shaft in the tubular portion of the high speed shaft, a third bearing supporting the low speed shaft in the second wall intermediate the ends of said low speed shaft, a first gear secured on said low speed shaft adjacent the extending end thereof, a fourth bearing positioned on the extending end of said low speed shaft and supported within the tubular portion of said high speed shaft, a countershaft, bearing means supporting said countershaft in said first and said second walls, a second gear on the low speed shaft intermediate said first and said fourth bearings, a third gear on said countershaft in mesh with said second gear, and a fourth gear on said countershaft in mesh with said first gear.

5. A transmission adapted to be mounted on an extending power input shaft of a unit to be driven and to provide a speed reduction between a prime mover and the input shaft of the unit to be driven, said transmission comprising an outer sheet metal casing providing an enclosure for the shaft gear, a first and a second spider in said casing and providing respectively a first and a second wall, a high speed shaft adapted to be driven by said prime mover and including a tubular portion within said casing, a first bearing supporting said high speed shaft in the first wall intermediate the ends of said shaft, a low speed shaft coaxial with the first shaft and having one end thereof extending into the tubular portion of the high speed shaft, the other end of said low speed shaft being tubular for mounting on the power input shaft of the unit to be driven, a second bearing supporting the end of the low speed shaft in the tubular portion of the high speed shaft, a third bearing supporting the low speed shaft in the second wall intermediate the ends of said low speed shaft, a first gear secured on said low speed shaft adjacent the extending end thereof, a fourth bearing carried by the low speed shaft intermediate said second and third bearings and by the tubular portion of the high speed shaft, a countershaft, bearing means supporting said countershaft in said first said second walls, a second gear on the high speed shaft intermediate said first and said fourth bearings, a third gear on said countershaft in mesh with said second gear, and a fourth gear on said countershaft in mesh with said first gear.

JOSEPH D. CHRISTIAN.

REFERENCES CITED

The following references are of record in the file of this patent:

UNITED STATES PATENTS

| Number | Name | Date |
| --- | --- | --- |
| 1,674,200 | Gatten | June 19, 1928 |
| 1,773,696 | Robertson | Aug. 19, 1930 |
| 1,949,643 | Bannan | Mar. 6, 1934 |
| 1,971,968 | Schmitter | Aug. 28, 1934 |
| 2,264,031 | Ware et al. | Nov. 25, 1941 |
| 2,288,206 | Pierpont | June 30, 1942 |

FOREIGN PATENTS

| Number | Country | Date |
| --- | --- | --- |
| 470,513 | Great Britain | Aug. 17, 1937 |